(12) United States Patent
Merritt

(10) Patent No.: US 7,387,103 B2
(45) Date of Patent: *Jun. 17, 2008

(54) INTERNAL COMBUSTION ENGINE

(76) Inventor: Dan Merritt, 139 Baginton Road, Styvechale, Coventry (GB) CV3 6FY ( * ) Notice: Subject to any disclaimer, the term of this patent is extended or adjusted under 35 U.S.C. 154(b) by 0 days.

This patent is subject to a terminal disclaimer.

(21) Appl. No.: 11/595,467

(22) Filed: Nov. 7, 2006

(65) Prior Publication Data

US 2007/0051338 A1    Mar. 8, 2007

Related U.S. Application Data

(63) Continuation-in-part of application No. 10/529,529, filed as application No. PCT/GB04/04828 on Nov. 16, 2004, now Pat. No. 7,152,572.

(30) Foreign Application Priority Data

| Nov. 19, 2003 | (GB) | ................... | 0326916.4 |
| Dec. 9, 2003 | (GB) | ................... | 0328471.8 |
| Dec. 17, 2003 | (GB) | ................... | 0329289.3 |
| Dec. 24, 2003 | (GB) | ................... | 0329989.8 |
| Feb. 28, 2004 | (GB) | ................... | 0404549.8 |
| Mar. 15, 2004 | (GB) | ................... | 0405735.2 |
| Jun. 5, 2004 | (GB) | ................... | 0412627.2 |
| Jan. 9, 2006 | (GB) | ................... | 0600301.6 |
| Jan. 16, 2006 | (GB) | ................... | 0600843.7 |
| May 17, 2006 | (GB) | ................... | 0609721.6 |

(51) Int. Cl.
*F02B 19/08* (2006.01)

(52) U.S. Cl. ...................... 123/253; 123/262

(58) Field of Classification Search ............... 123/253, 123/260, 261, 262, 263, 286

See application file for complete search history.

(56) References Cited

U.S. PATENT DOCUMENTS

| 2,902,011 | A | * | 9/1959 | Hoffmann | .................... 123/279 |
| 4,038,952 | A | | 8/1977 | Nagano | .................... 123/32 K |
| 4,248,192 | A | * | 2/1981 | Lampard | .................... 123/256 |
| 4,332,224 | A | | 6/1982 | Latsch et al. | ................ 123/254 |
| 4,351,294 | A | | 9/1982 | Giddings | .................... 123/291 |
| 4,594,976 | A | | 6/1986 | Gonzalez | .................... 123/260 |
| 4,765,293 | A | | 8/1988 | Gonzalez | .................... 123/275 |
| 4,799,465 | A | * | 1/1989 | Yanagisawa et al. | ........ 123/256 |

(Continued)

FOREIGN PATENT DOCUMENTS

DE    1 034 915 B    7/1958

(Continued)

*Primary Examiner*—Erick Solis
(74) *Attorney, Agent, or Firm*—Pedersen & Co., PLLC; Ken J. Pedersen; Barbara S. Pedersen

(57) ABSTRACT

A high thermal efficiency lean-burn spark- ignition two or four stroke engine operable unthrottled suitable for vehicles using gasoline. It uses an indirect combustion chamber and a transfer orifice with or without shaping of the combustion chamber to produce a jet of air moving in helical swirl motion around the chamber during the compression stroke. Fuel is injected into the chamber aimed into the air jet to assist rapid vaporization. The position and orientation of the fuel injector ensures that fuel arrives near the spark plug even under idling conditions and the helical swirl flow ensures the stratification of the ignitable mixture formed near the plug. The compression ratio of the engine can also be variable.

24 Claims, 12 Drawing Sheets

U.S. PATENT DOCUMENTS

| | | | |
|---|---|---|---|
| 5,067,457 A | 11/1991 | Shinzawa | 123/269 |
| 5,086,735 A | 2/1992 | Melchior et al. | 123/65 VD |
| 5,243,940 A | 9/1993 | Gopel | 123/299 |
| 5,307,772 A | 5/1994 | Rao et al. | 123/272 |
| 5,392,744 A * | 2/1995 | Regueiro | 123/262 |

FOREIGN PATENT DOCUMENTS

| | | |
|---|---|---|
| GB | 2 123 482 A | 2/1984 |
| JP | 61 135924 A | 6/1986 |

* cited by examiner

SECTION A-A

SECTION B-B

SECTION X-X

INTERNAL COMBUSTION ENGINE

This application is a continuation-in-part of U.S. patent application Ser. No. 10/529,529, filed as a 371 National Entry Application on 29 Mar. 2005, which claims priority of PCT/GB04/04828, filed 16 Nov. 2004, which claims priority of UK Patent Application 0326916.4, filed 19 Nov. 2003; UK Patent Application 0328471.8, filed 9 Dec. 2003; UK Patent Application 0329289.3, filed 17 Dec. 2003; UK Patent Application 0329989.8, filed 24 Dec. 2003; UK Patent Application 0404549.8, filed 28 Feb. 2004; UK Patent Application 0405735.2, filed 15 Mar. 2004; and UK Patent Application 0412627.2, filed 5 Jun. 2004. Further, this application claims priority of UK Patent Application 0600301.6, filed 9 Jan. 2006; UK Patent Application 0600843.7, filed 16 January 2006; and UK Patent Application 0609721.6, filed 17 May 2006.

FIELD OF THE INVENTION

This invention relates to spark ignited reciprocating internal combustion engines operating either on the four stroke or on the two stroke engine cycles.

In particular it relates to lean-burn gasoline engines using stratified charge methods. The engine can operate at part load without restricting the air intake in order to promote higher thermal efficiency at part load.

SUMMARY OF THE INVENTION

This invention is suitable for use in automotive and motor-cycle applications and has a potential to enable large savings of fuel used in urban transport. Given a suitable design according to this invention the difficult technical problem of operating a spark ignited engine unthrottled may be overcome over the full operational range of the engine.

An engine according to this invention can be constructed to operate either on the four stroke engine cycle or on the two stroke engine cycle. An engine according to this invention can be constructed to operate either with constant value of compression ratio or with variable compression ratio.

Accordingly, this invention provides an internal combustion engine comprising;
a piston reciprocating in a cylinder;
air inlet means communicating with the cylinder;
exhaust means communicating with the cylinder;
an indirect combustion chamber communicating with the cylinder comprising a near end and
a far end in relation to the piston;
a transfer orifice communicating with the cylinder and the combustion chamber at its near end;
spark ignition means located in the combustion chamber;
a fuel injector communicating with the combustion chamber;
a controller to control the fuel injection process and spark ignition;
characterised in that the transfer orifice is adapted to deliver a jet of air into the combustion chamber during the compression stroke of the piston, the jet of air moving around the periphery of the combustion chamber in helical swirl motion in which the jet of air has a tangential velocity component around the combustion chamber and an axial velocity component along the combustion chamber, the axial velocity component being directed away from the near end and towards the far end, and in that the fuel injector is adapted to deliver some fuel into the said jet of air within the chamber in a direction which also enables a spark ignitable mixture to form in the gas arriving at the spark ignition means.

Preferably the combustion chamber is symmetrical about a central axis, for example cylindrical, but other shapes can be used to advantage. The periphery may be smooth, or serrated or undulating in order to promote turbulence.

The term helical swirl is used herein to describe gas movement in the combustion chamber where the gas rotates around the periphery of the combustion chamber whilst it also moves in the axial direction in a cork screw type motion towards the far end of the combustion chamber. On reaching the far end the gas continues in its peripheral rotation and the gas arriving from behind presses against the gas in front as its axial momentum is absorbed. This may cause some of the gas arriving later to remain at least partially separated from the gas which arrived earlier, so providing a degree of stratification.

Thus, helical swirl motion consists of two velocity directional elements. The first is a swirling motion around the periphery of the combustion chamber and the second is an axial velocity component superimposed on the swirling motion in the direction from the near end towards the far end of the combustion chamber. Preferably, the swirling motion is best obtained by locating the transfer orifice so as to deliver the air jet with a substantial tangential component relative to the periphery of the combustion chamber. The axial velocity component can be induced either by the orientation of the transfer orifice relative to the axis of the combustion chamber or by constructing an internal surface or surfaces inside the combustion chamber at its near end designed to impart to the jet of air an axial velocity component after it enters the combustion chamber whilst retaining its swirling motion induced by tangential entry.

Alternatively, internal surfaces can be used to impart axial velocity to the air in the combustion chamber in combination with an inclined transfer orifice sharing the task between the two constructions. Alternatively again, internal surfaces can also be used to assist in imparting and or maintaining swirl motion to the air in the combustion chamber.

Arrangements where the axial velocity component is induced only by internal surfaces offer a number of important advantages to the engine. It allows the transfer orifice to be orientated at substantially 90° to the axis of the combustion chamber and as a result to have a reduced axial length as its length is no longer needed to provide axial direction to the air jet. The short length substantially reduces fluid friction and heat losses during the compression and expansion strokes of the engine when high velocity gas is transferred through the transfer orifice and the reduction of losses will improve the thermal efficiency of the engine. It also reduces the size of the transfer orifice entrance on the flame plate of the cylinder head. The entrance can be made circular instead of elliptical and this will allow the diameter of the breathing valves on the flame plate to be maximised. Also, there is no longer a need to incline the axis of the combustion chamber in order to reduce the size of this elliptical entrance, allowing the combustion chamber to be incorporated into the cylinder head in a more compact form and allowing the fuel injectors a more convenient directional orientation.

In an arrangement where the transfer orifice imparts only tangential velocity component to the air jet the axial velocity component is imparted by the internal surface of the combustion chamber at the near end of the chamber. Preferably the near end is shaped like a helical ramp or wedge wound around the axis of the chamber like a screw thread in the same direction as the rotation of the swirling flow. This helical surface is preferably made integral with the near end face and terminates after turning around a suitable angle around the axis of the combustion chamber. Preferably the angle need not exceed approximately 270° allowing approximately 90° of flat surface to precede the ramp to allow access to the air jet and provide a flat surface through which the fuel injector port can be positioned to advantage, discharging towards the far end of the combustion chamber. However, the angle can be smaller or larger than 270° if this is found to be sufficient or necessary to impart the axial velocity to the swirling flow. If necessary the fuel injector port may be positioned to pass through the inclined surface of the ramp pointing towards the far end of the chamber.

Preferably the transfer orifice faces the start of the incline of the ramp. An alternative suitable position for the fuel injector is to discharge in line with the transfer orifice in the opposite direction to the direction of the air jet. In such an arrangement the helical ramp can start later, for example to allow 180° of flat surface so that both the fuel injection spray and air jet have free access through and into the combustion chamber at the near end. It is possible to use two fuel injectors per engine cylinder one facing the far end of the chamber and the other facing the transfer orifice.

The helical ramp terminates with a wall which, preferably to advantage, should have a minimised surface area and preferably lie in a direction parallel with the axis of the combustion chamber. In one alternative construction the ramp may continue beyond its end wall to reach the transfer orifice and to form a cavity opposite it, the ramp being the roof of the cavity and the end wall acting as a deflector to force air towards the open ended exit of the cavity, in a tangential direction and towards the start of the ramp. Such construction can be used to promote a tangential swirl velocity component to the air jet.

A similar effect may be obtained by shaping the corner formed between the near end face of the combustion chamber where it meets the periphery of the combustion chamber to form an incline leading to a peripheral channel shaped like a helical channel or deep groove formed in the cylindrical wall of the combustion chamber and designed to induce an axial flow movement. The channel or groove can be chosen to start at the peripheral edge at the near end of the combustion chamber and downstream from the transfer orifice to allow it to receive the air jet after it moves from the transfer orifice around the periphery and it may extend in the axial direction, spiralling around the periphery of the combustion chamber, for part of or the whole way towards the far end of the combustion chamber. This construction is believed to be self explanatory and is therefore not illustrated with the aid of diagrams.

Preferably, the fuel injection means is an electrically actuated injector capable of withstanding combustion conditions and injecting into pressurised gas.

Preferably also, the controller provides control of both the timing and duration of fuel injection and where necessary also the pressure of fuel supplied to the fuel injector. The term air is used herein to describe air which is either pure or contains other gases such as products of combustion or even hydrocarbon gases. The term mixture describes air mixed with vaporised fuel destined for combustion. The term lean mixture is used to describe an air and fuel mixture that is not ignitable directly by the spark ignition means used in the engine.

The term near end herein describes the end of the combustion chamber situated nearer the piston and the transfer orifice. The term far end herein describes the end of the combustion chamber situated opposite the near end, furthest from the transfer orifice.

The term chamber herein describes the combustion chamber and the term orifice describes the transfer orifice.

The term lean burn is used herein to describe the ability of an engine to perform with an overall lean mixture by using stratification.

The term stratification is used herein to describe gas movements which promote a non-homogeneous cohabitation of fuel and air within the combustion chamber volume so that a spark ignitable mixture ends up near the spark plug when the piston is at or near the end of the compression stroke and air or lean mixtures end up elsewhere within the combustion chamber.

The term compression ratio is used herein to describe the numerical value of the ratio of the swept volume of a cylinder together with its clearance volume divided by the clearance volume. The clearance volume is the volume occupied by gas when the piston reaches the end of its compression stroke.

The term air jet is used herein to describe the air as it enters the combustion chamber through the orifice during the compression stroke of the piston.

The term ignition pot is used herein to describe a cavity, with a free volume, containing a spark plug at one end, the volume communicates with the combustion chamber through a hole of a diameter smaller than the diameter of the spark plug threaded portion.

The term BMEP describes the brake mean effective pressure developed in the cylinder.

An engine constructed according to this invention must use the three devices listed below to perform lean-burn over at least part of its operational range.

1. It uses an indirect combustion chamber where fuel entry and ignition take place and utilises the air jet to assist in the rapid vaporisation of fuel spray.
2. It uses the position, orientation and size of the orifice and/or a suitably constructed combustion chamber to promote helical swirl in such a way that a mixture formed within this swirling flow following fuel injection arrives at a suitably positioned spark plug at the moment of ignition.
3. It uses a fuel injector placed in a position which allows at least some of the fuel spray to be delivered into the air jet or helical swirl flow formed by the air jet.

The fuel injector may be positioned to deliver a spray which intersects perpendicularly across the air jet or at any angle to it or it may deliver fuel axially into the air jet.

The air jet reaches maximum momentum towards the end (latter part) of the compression stroke and the air jet's velocity also increases with engine speed. Depending on fuel injector design fuel spray delivered at the beginning (early part) of the compression stroke or earlier, particularly at lower engine speeds, may penetrate beyond the air jet but such fuel can be absorbed into the air later on.

Spark plugs should be positioned where an ignitable mixture is formed just before the moment of ignition. The position depends on the location and orientation of the fuel injector and particularly on the timing of fuel injection relative to piston position, which can be described alternatively by the crank-angle location. Preferably, the spark plug should be shielded from high velocity gas and from the direct path of fuel spray. Such shielding can be provided by using an ignition pot.

An engine according to the present invention can also be constructed to operate with variable compression ratio in order to further improve its thermal efficiency. Such an engine can achieve this desired effect simply by decreasing the volume of the combustion chamber when higher compression ratios are desired and to do so with little interference with the nature of gas movement within the combustion chamber.

In an unthrottled engine such as this, part load or low load conditions are operated under lean conditions with excess air, in comparison with a stoichiometric mixture, and peak pressures in the cylinder at the end of the combustion period will be appreciably lower than the peak cylinder pressures produced at high output after the combustion of near stoichiometric mixtures. Lower load engine conditions may be selected to be suitable for operation at higher compression ratios compared with full load or higher load compression ratios. In this way the thermal efficiency at part load is further enhanced by the increase of compression ratio, whilst the peak cylinder pressures produced at full load are kept lower by operating at a lower compression ratio. Excessive compression ratios at full load are avoided as they may also cause detonation of premixed fuel/air mixtures.

The cylindrical shape of the combustion chamber at the far end allows the far end wall or a plunger to slide along the cylinder. The far end wall becomes in effect a displaceable piston which can remain stationary for a given selected compression ratio value and made to slide when the compression ratio requires changing.

There are a number of well known methods for effecting a gas seal to stop the high pressure gases in the combustion chamber escaping through the clearance needed for the sliding movement of the far end wall. Piston rings similar to those used to seal normal engine pistons can be used as well as other sealing devices capable of withstanding the temperatures encountered.

The actuation of the movement of the far end wall or plunger can take a number of forms, mechanical or hydraulic or both in combinations with or without the use of electrical energy.

BRIEF DESCRIPTION OF THE DRAWINGS

The preferred embodiments of the invention in its various aspects is further described herein by way of examples with reference to accompanying schematic diagrams which are not drawn to scale and are presented for illustrations purpose only.

In the embodiments of FIGS. 1-9 the axial velocity component needed for helical swirl is induced by inclining the transfer orifice to the axis of the combustion chamber. FIGS. 10-15 show the use of internal surfaces for this purpose.

DETAILED DESCRIPTION OF THE PREFERRED EMBODIMENTS

Referring to the figures, there are shown some, but not the only, embodiments of the invention.

Figure 1:
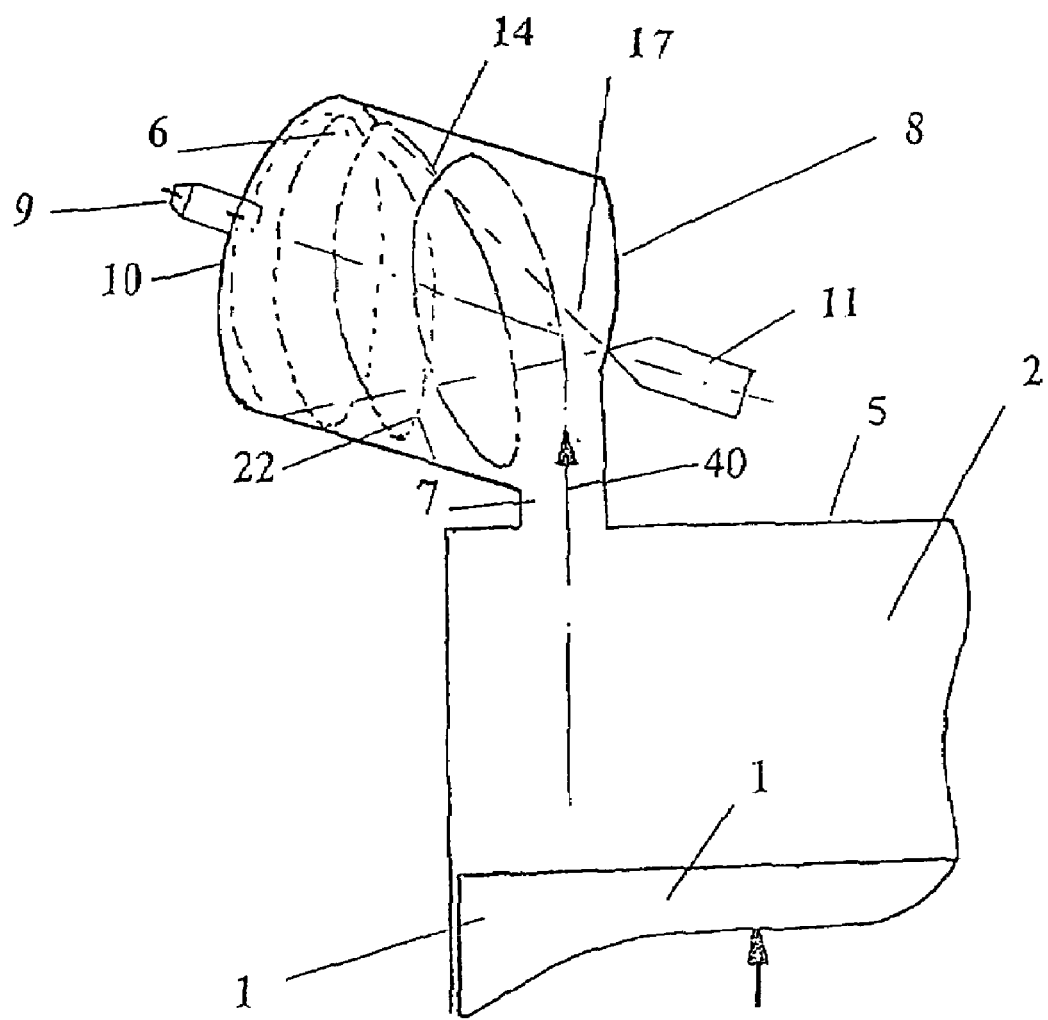
FIG. 1 is a sectional elevation through part of a cylinder and a combustion chamber with the transfer orifice shown inclined to the axis of the combustion chamber illustrating a stream line undergoing helical swirl flow pattern.

FIG. 1 shows by way of an example one embodiment of the invention in which piston 1 moves in cylinder 2 during the compression stroke. The combustion chamber 6 communicates with the cylinder through orifice 7. The fuel injector 11 delivers fuel across the air jet 40. The fuel cone is shown to intersect the air jet and to extend to the full diameter of the cylindrical combustion chamber when it reaches the far end 10 where the spark plug 9 is situated. The diagram also illustrates a stream line 14 rotating around the periphery 22 of the combustion chamber in helical swirl motion. This embodiment avoids fuel delivery directly into cylinder 2 so reducing hydrocarbon emissions to a minimum. An engine constructed in this way was found to be capable of unthrottled operation even at idling and low BMEP. At idling and other low BMEP conditions a small quantity of fuel is injected early in the compression stroke and is understood to pass through the weak air jet to be deposited on the far wall of the combustion chamber 10 and/or the periphery 22 near the far end. When the helical swirl air arrives at the far end it vaporises this deposited fuel and the resulting mixture was found to remain near the far end until the moment of ignition by the spark plug 9. It will be understood that the position of the spark plug can be varied by the engine designer for optimum performance.

At higher BMEP conditions the duration of fuel injection is increased over longer crank-angle arc and as a result an increased amount of mixture is contained within the gas extending from the far end 10 towards the near end 8. Under these conditions more fuel will be absorbed into the air jet 40 flowing across the fuel spray 17, as the air jet's momentum increases. As engine speed increases fuel line pressure may need to rise to allow the required amount of fuel to be delivered during the available crank-angle arc period. The engine designer can select the best combination for fuel injection timing, duration and pressure under various engine conditions and select a suitable location for the spark plug 9. The engine management system 12 (see FIG. 2) can be programmed accordingly.

Figure 2:
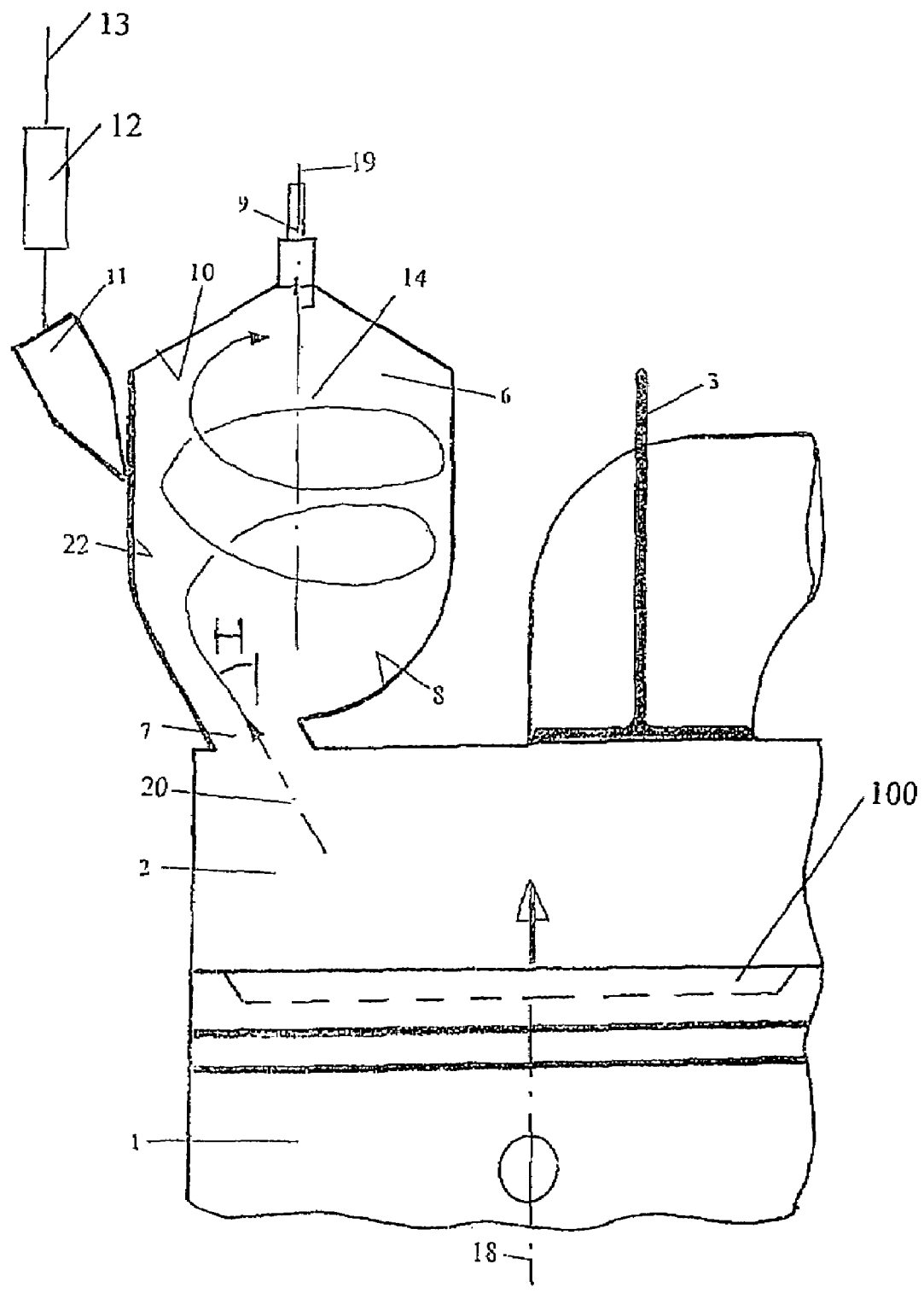
FIG. 2 is a sectional elevation through part of a cylinder and combustion chamber which is aligned with the axis of the cylinder, representing another embodiment of an engine constructed according to the invention.

FIG. 2 shows another embodiment according to the invention, by way of an example. It shows piston 1 moving in cylinder 2, during the compression stroke, along axis 18 which is parallel with the chamber's axis 19. Cylinder 2 communicates with inlet and exhaust valves in known fashion, both represented by poppet valve 3. The combustion chamber 6 is cylindrical with a conical far end 10 where spark plug 9 is situated. The orifice 7 is inclined to the axis 19 at an angle H which is less that 90° and enters the chamber 6, at the near end 8, with in a direction having both axial and tangential components. The tangential component is not illustrated in this diagram. The air jet entering the chamber 6 is illustrated by vector 20 which changes direction to flow around the wall of the chamber 22, in a helical swirl pattern as illustrated by streamline 14. The piston crown has an optional cavity 100 which allows some mixture to bum over the piston, if the engine designer wishes this to take place.

The engine controller 12 determines the timing and duration of fuel injection, the fuel line pressure and the timing of spark ignition. The fuel line 13 is shown passing through it for illustration only.

The engine illustrated in FIG. 2 is different from the one shown in FIG. 1 in that it shows a fuel injector 11 aligned with the axis of orifice 7 allowing fuel sprays to be injected into the air jet 20 co-axially and in the opposite direction. This can promote very rapid vaporisation. Also, fuel injected early on in the compression stroke, particularly at low engine speed, when the air jet 20 is weak, or fuel injected during the preceding induction stroke, can enter cylinder 2 through the orifice and evaporate therein. Later on in the compression stroke this mixture will be delivered into the combustion chamber by the piston. Additional fuel added to the air jet near the end of the compression stroke can be controlled to form an ignitable mixture A design chosen according to FIG. 2 or FIG. 3 need not use a cavity in the piston crown as shown in FIG. 2. However, engines designed to allow a large proportion of the engine clearance volume to be in cavity 100 will result in a substantial reduction of combustion chamber volume in order to maintain a desired compression ratio. In such an engine, during idling and low BMEP the combustion chamber 6 can be designed to receive all the fuel needed by injecting the fuel near the end of the compression stroke. At higher BMEP additional fuel can be injected earlier into the cylinder through orifice 7 to form a mixture in cavity 100 at the end of the compression stroke. In this form the combustion chamber operates primarily in a lean mixture igniter mode for cavity 100. If the mixture in cavity 100 is excessively lean and can not be ignited by the flame leaving the combustion chamber after ignition, an engine constructed to operate in this mode may be found to need to use partial throttling of the air intake over a range of low BMEP conditions but such throttling will be less severe in comparison with conventional gasoline engines operating at the same BMEP.

Figure 3:
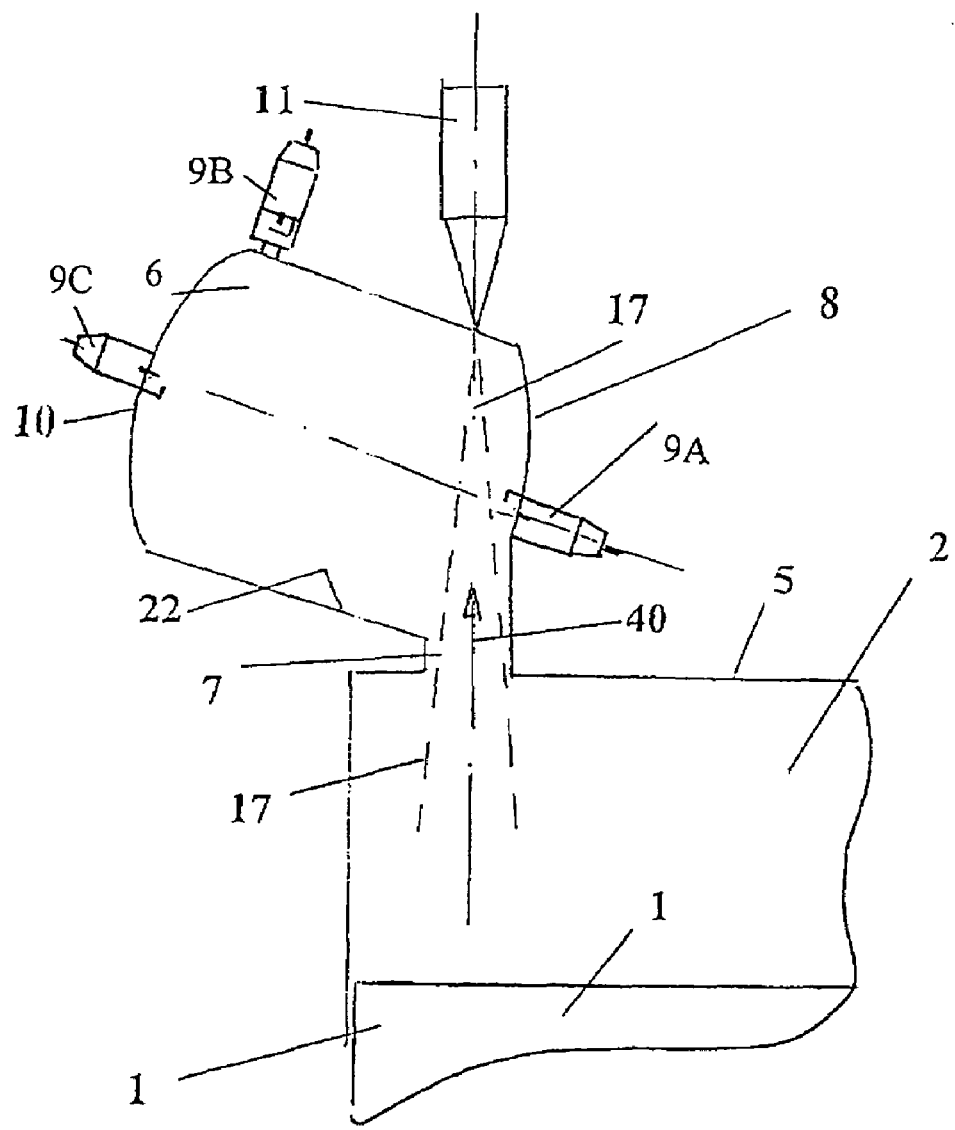
FIG. 3 is a sectional elevation of part of a cylinder and a combustion chamber with a fuel injector oriented towards the transfer orifice as in FIG. 2 and showing alternative spark plug positions.

FIG. 3 illustrates a fuel injector 11 aligned with the air jet 40. As in FIGS. 1 and 2 the combustion chamber axis is inclined to the transfer orifice axis to promote the axial velocity component of helical swirl. Fuel spray cone 17 is shown penetrating into cylinder 2 during the early part of the compression stroke when the air jet 40 is weak. The diagram also illustrates various spark plug positions which may assist designers to meet optimum engine performance. Position 9A may be found suitable to ignite a mixture formed late in the compression stroke when the mixture is stratified at the near end 8 of the combustion chamber 6 whilst most of the combustion chamber starting from the far end is filled with swirling air without fuel. Such arrangement may suit idling and starting conditions for an engine designed according to this embodiment or suit an engine designed to operate in the igniter mode described above. At higher BMEP conditions the duration of fuel injection is increased by starting the injection earlier in the compression stroke and as a result an increased amount of mixture is contained within the combustion chamber in the space from the near end towards the far end, whilst the space at the far end contains air without fuel.

Another option available when operating at higher fuelling conditions, particularly near the top end of BMEP output, fuel injection may even take place during the induction stroke of the engine so that fuel is allowed to enter the cylinder 2 through the transfer orifice. Such fuel will vaporise inside the cylinder and enter the combustion chamber as a mixture, during the compression stroke.

Positions 9B or 9C can be chosen as alternatives or in addition to position 9A, using two spark plugs per cylinder, if this is found necessary in order to cope with a wide fuelling range. Spark plug 9B is shown situated in an ignition pot, where it is shielded. Other spark plug positions or arrangements may be found in preference to the ones shown in FIG. 3.

Figure 4:
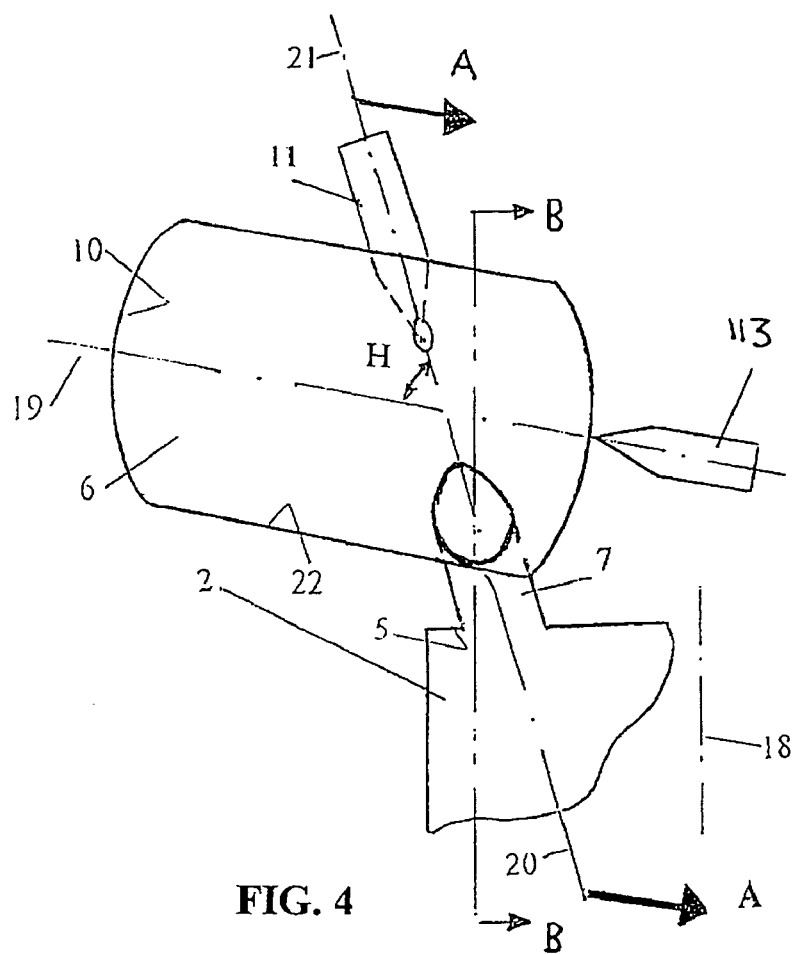
FIG. 4 illustrates a combustion chamber inclined to the axis of the cylinder showing transfer orifice location and two alternative positions for the fuel injector.

FIGS. 4 to 8 illustrate the geometry of a combustion chamber in relation to an inclined transfer orifice which is designed to promote helical swirl. The arrangement shown in FIG. 2 can cause helical swirl with an excessive axial component since the inclination H of orifice 7 to axis 19 is relatively small. In FIG. 4 the inclination angle H is larger and this reduces the axial velocity component of helical swirl.

Figure 5:
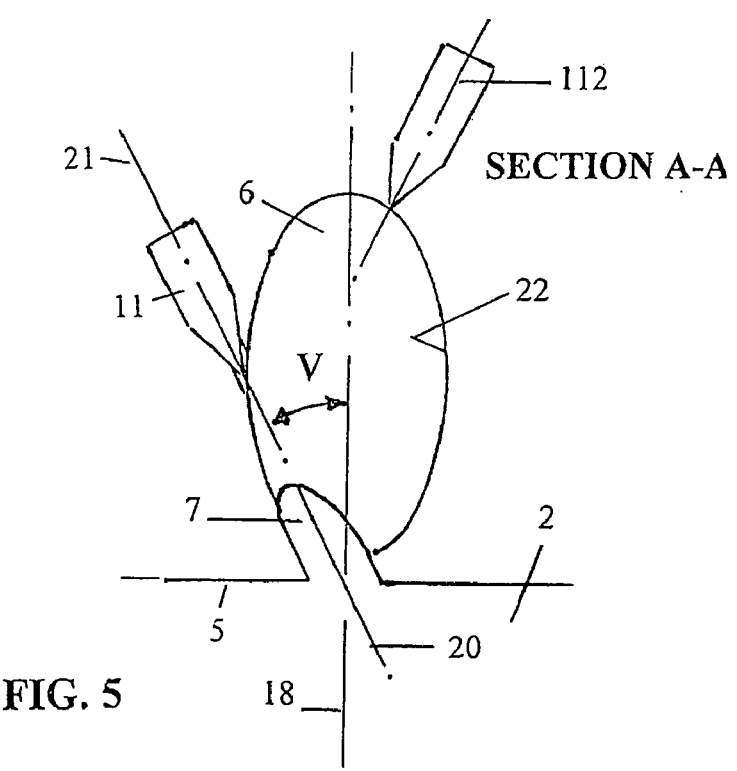
FIG. 5 illustrates a section along the line A-A of FIG. 4 of a similar combustion chamber showing orifice location for a tangential entry and a third position for the fuel injector.

The tangential velocity component of helical swirl is determined by angle V between axis 20 and axis 18 shown in the sectional view of FIG. 5. This controls the angular velocity of the swirl for a given jet velocity. A tangential entry illustrated in FIG. 5 will provide a maximum value.

The cross sectional area of orifice 7 will determine the velocity of the air jet. It is advantageous to maximise this area in order to reduce the pumping losses when gases move between the cylinder 2 and combustion chamber 6 and by doing so it was found that such losses can be kept to low values.

FIGS. 4 and 5 do not show positions for the spark plug, instead they illustrate some alternative positions for fuel injectors according to this invention since the orientation of the injectors, 112, 113 and 11 are all dependent upon the position of orifice 7. More than one fuel injector can be used if desired.

Figure 6:
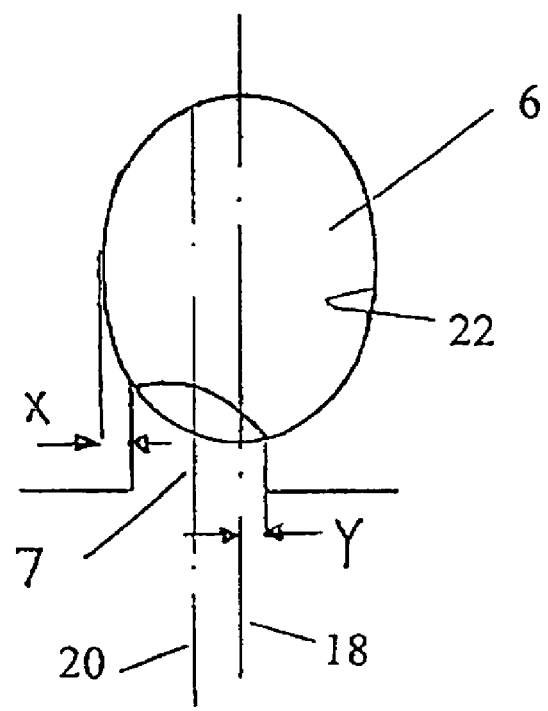
FIG. 6 illustrates another section along the line B-B of FIG. 4 of the combustion chamber showing the effect of the location of the transfer orifice on the intensity of helical swirl.

FIG. 6 illustrates a method for controlling the intensity of the angular velocity component of helical swirl at the design stage. The axis 20 of orifice 7 is displaced from the diameter

18 which is parallel to it. Displacing the air jet from the periphery 22 by distance X will reduce the swirl intensity. If the jet diameter is allowed to extend beyond diameter 18 by an amount Y, the angular intensity will be greatly reduced since part of the air jet will oppose the direction of rotation of helical swirl. When axis 20 coincides with diameter 18 there will be no swirl motion.

Figure 7:
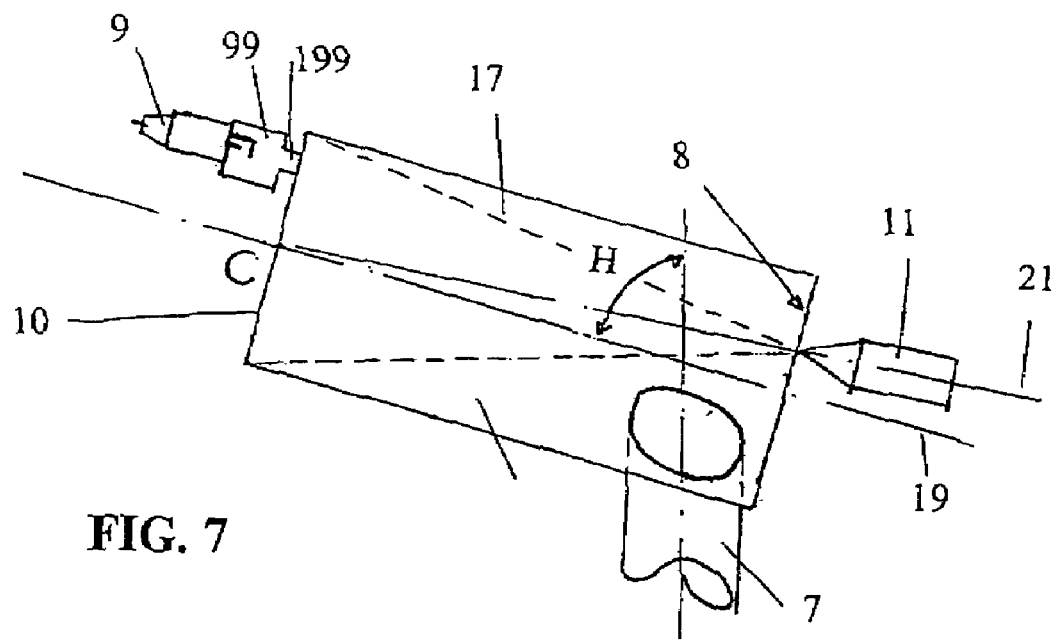
FIG. 7 illustrates a sectional elevation along the lines X-X of FIG. 8, showing details of a combustion chamber where the fuel injection takes place across the path of the air jet.
Figure 8:
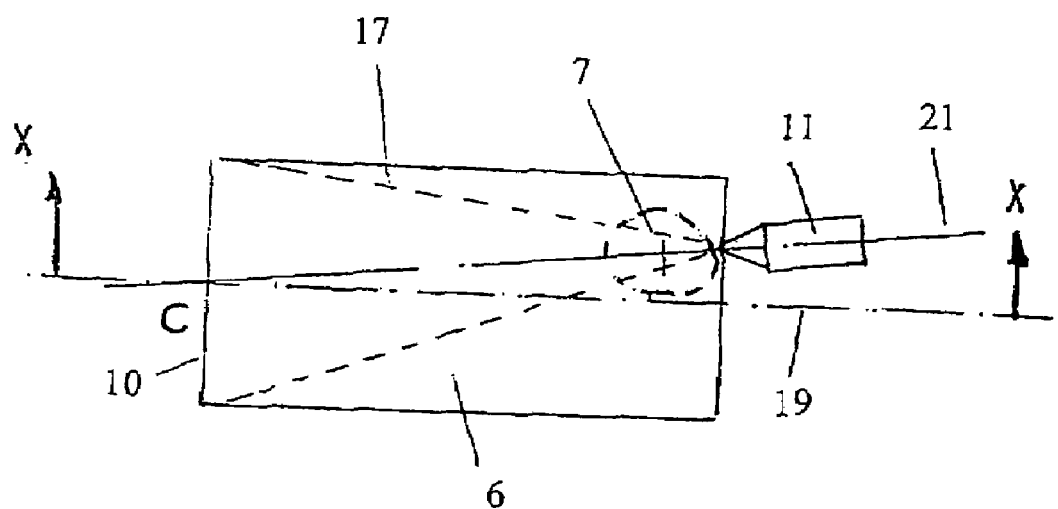
FIG. 8 illustrates a plan view of FIG. 7.

FIG. 7 and FIG. 8 illustrate the relative positions of the orifice, the fuel injector and spark plug for an embodiment of this engine illustrating the interaction between the air jet and fuel spray. Such an engine has been built and tested and can idle unthrottled.

In plan view, FIG. 8, the injector axis 21 is shown passing near the centre of orifice 7 pointing towards the centre C of the far end 10 of the combustion chamber 6. Orifice 7 is shown to one side of axis 19 in order to promote a tangential component to the helical swirl flow, the axial component is provided by the inclination angle H being less than 90°. FIG. 7 shows the injector positioned to deliver fuel spray 17 to the air jet from a position above orifice 7 again in a direction towards centre C at the far end. Where necessary to avoid liquid fuel being deposited on spark plug 9 (which can cause a short circuit) the spark plug is placed inside an ignition pot 99 which communicates with the combustion chamber through orifice 199 which can be either axial or inclined to the axis of the spark plug. This device may prove to be necessary to enable cold starts.

The far end wall 10 of the combustion chamber may be shaped. For example it may be flat, concave or convex. It may be provided with surface projections shaped so as to induce turbulence and/or promote mixing of peripheral gas flow towards the centre of the chamber at the far end if this proves necessary. The peripheral or side wall of the combustion chamber 22 may also be provided with surface undulations and surface projections to promote turbulence if this proves necessary.

Figure 9:
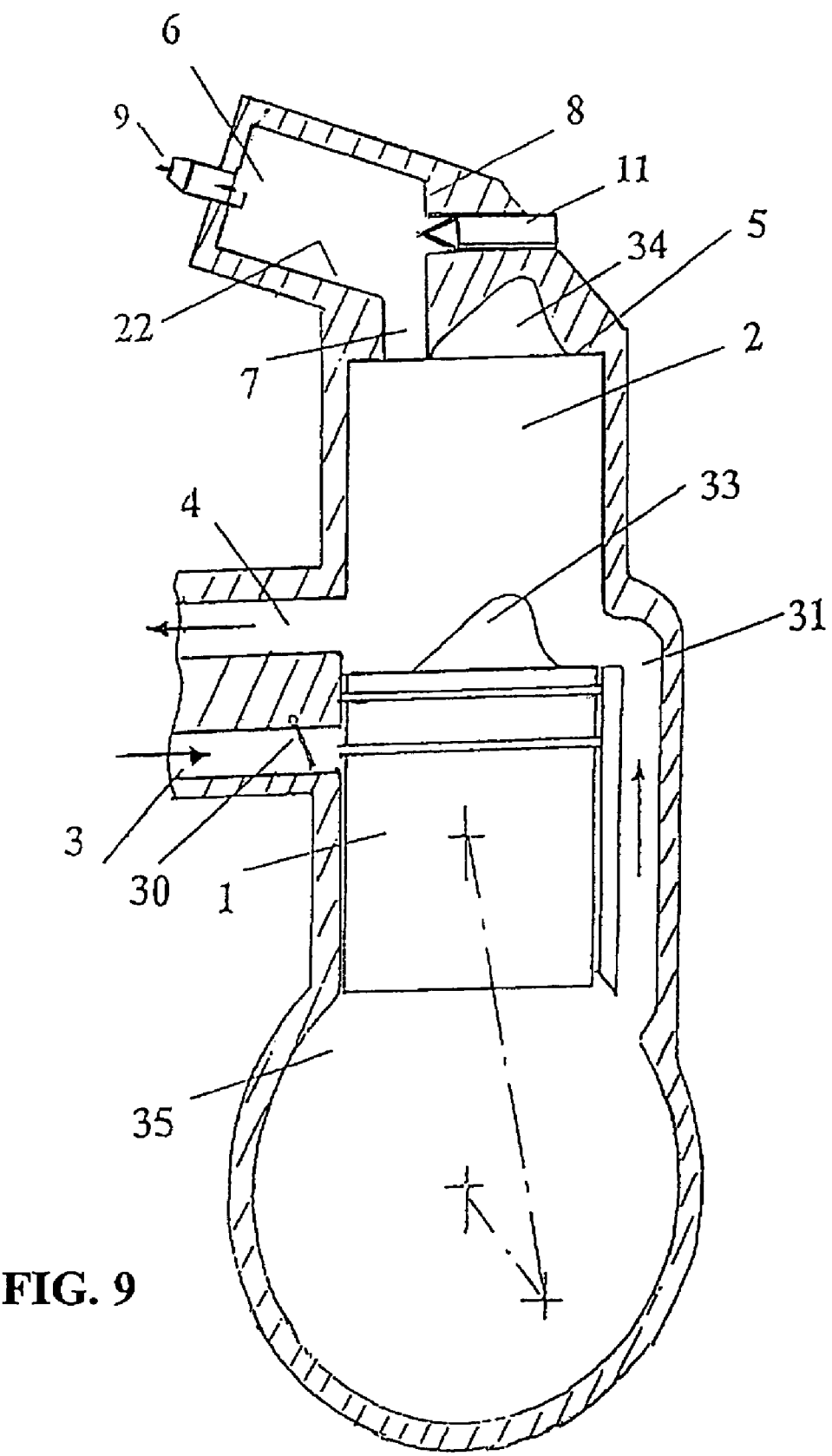
FIG. 9 illustrates one embodiment of a two stroke engine constructed according to the invention.

FIG. 9 illustrates the application of the invention to one embodiment of a two stroke engine. The two stroke engine shown uses an inclined transfer orifice with an angle H which is less than 90°.

Air enters the crankcase through inlet port 3 provided with a non return valve 30 during the compression stroke of piston 1. Unlike conventional two stroke engines the air intake is left unthrottled at part load and is not mixed with any fuel. When the transfer port 31 is uncovered by the piston near the end of its subsequent expansion stroke the air is transferred into cylinder 2 and is deflected into a loop scavenge flow direction by projection 33 situated on the crown of piston 1. The fuel injector 11 can start injecting fuel into combustion chamber 6 when the piston covers the exhaust port 4 during the early part of its compression stroke, or even earlier. When required, to increase BMEP, the fuel injector can continue to do so until near the end of the compression stroke.

It is advantageous to minimise the volume in cylinder 2 at the end of the compression stroke in order to deliver the maximum amount of air into the combustion chamber and the shapes of projection 33 and recess 34 can be made similar in order to achieve this aim.

This arrangement removes disadvantages inherent in the conventional two stroke design, one being the presence of fuel in cylinder 2 during the blow down period, and the other being the need to throttle the air intake at part load. The stratified charge capability and efficient fuel preparation can offer a two stroke engine modified according to this invention much improved thermal efficiency, cleaner exhaust and high speed operation. A two stroke engine according to this invention can also use internal surfaces, such as a helical ramp, to promote the axial velocity component needed to generate helical swirl.

Figure 10:
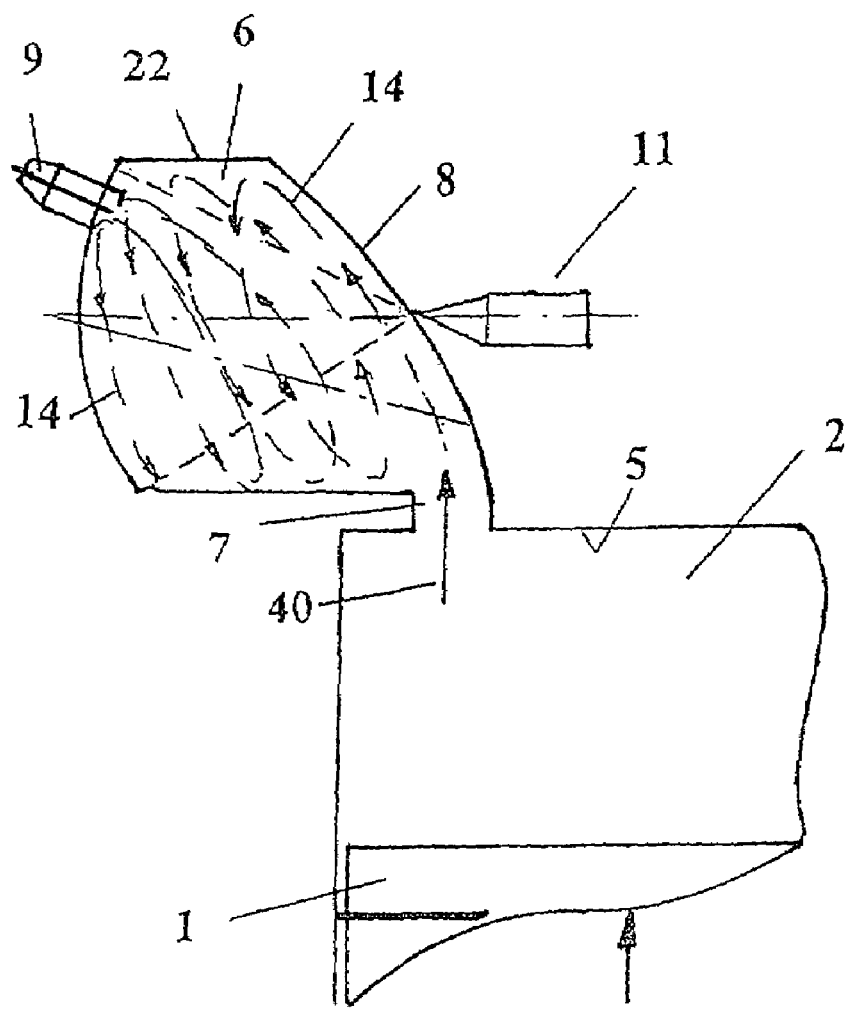
FIG. 10 is a similar view of the arrangement for an engine as illustrated in FIG. 1 showing the use of internal surfaces to promote an axial velocity component to the air jet.

In the embodiment of FIG. 10 many components have the same functions as those of the embodiment of FIG. 1, and are given the same reference numerals. The function of the common components will not be repeated. In this embodiment the jet 40 enters the combustion chamber at substantially 90° with a tangential velocity component but without an axial velocity component. The axial velocity component is produced by the inclined shape of the inner surface of the combustion chamber end wall at the near end 8, shown to be in the same direction as the streamline 14.

The actual geometrical shape of the surface at 8 can take various forms. In the simple sketch of FIG. 10 the near end face is shown to lean towards the far end of the combustion chamber so as to impart an axial velocity component to the air entering through transfer orifice 7.

Alternatively, not shown, the near end wall can be tilted towards the far end from one side to the other, the side furthest from transfer orifice 7 being nearer the far end than the side nearest to transfer orifice 7. Generally speaking it can be shaped to contain an inclined face pointing in the axial direction away from the near end.

In a preferred form of this invention the wall can be shaped in a more complex form such as a wedge spiralling around the periphery to form a helical ramp, the helical ramp having a constant or varying (preferably increasing) pitch.

Figure 11:
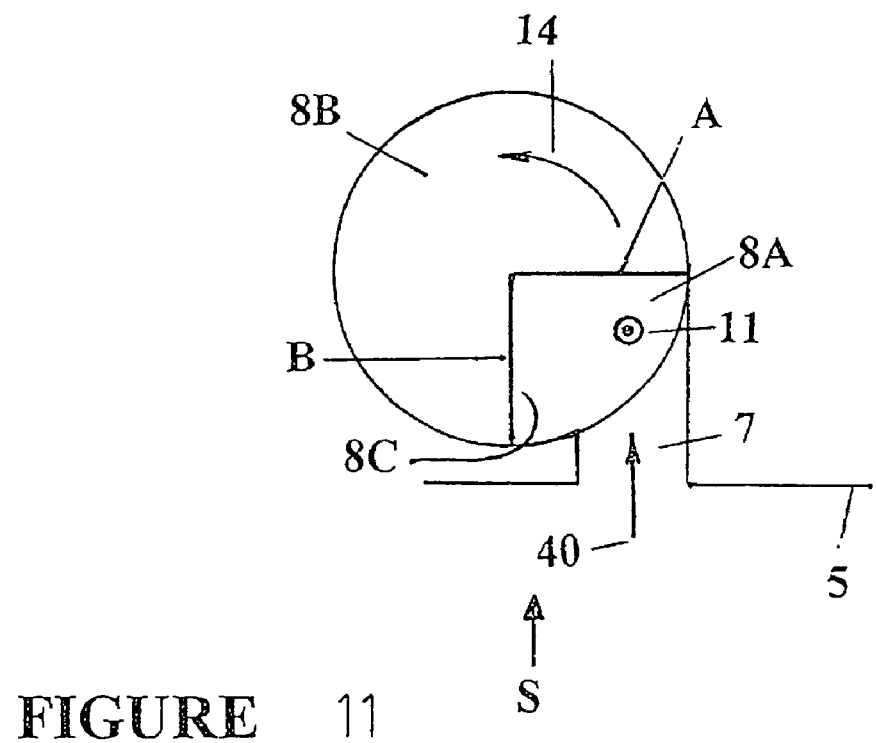
FIG. 11 is an internal end view into the combustion chamber of another embodiment of an internal surface constructed as a helical ramp over substantially 270°, this end view is simplified by ignoring the wall thickness of a section of the combustion chamber when looking towards the near end from the inside of the chamber.
Figure 12:
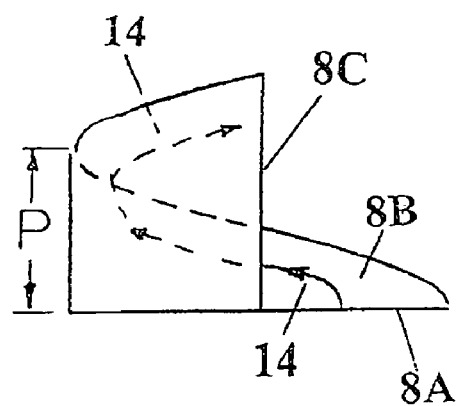
FIG. 12 is a view in direction S shown in FIG. 11, again ignoring combustion chamber wall thicknesses and omitting to show the transfer orifice 7 and fuel injector 11; the simplifications are for the sole purpose of illustrating a possible shape of the helical ramp 8B.

FIGS. 11 and 12 show one embodiment of such an arrangement. FIG. 11 shows an internal view towards the near end of combustion chamber 8 in which the entry hole for the fuel injector 11 can be seen, together with the transfer orifice 7 and the vector representing the velocity vector of the air jet 40 at entry to the combustion chamber. Also illustrated is a streamline 14 moving in peripheral rotation. Radial line A shows the beginning of a rising helical ramp 8B following a flat platform 8A, the platform 8A being coincident with an edge of the transfer orifice 7. The ramp 8B extends through approximately 270° around the chamber, to line B where it terminates in wall 8C positioned in the axial direction between surfaces 8C and 8A.

FIG. 12 illustrates the helical ramp of FIG. 11 in a more visual way including the streamline 14 as it moves along the ramp. Dimension P represents the dimension of half the pitch of the helix, which pitch determines the intensity of the axial component of the helical swirl motion. In this embodiment the pitch is constant. This arrangement allows the engine designer to accurately select the helix angle allowing a sensitive control over the gas dynamics of the helical swirl flow. The ramp can influence the air flow over a relatively large arc, 270° in this example, offering more stability, or it can extend over a shorter arc if this is found to be sufficient.

Figure 14:
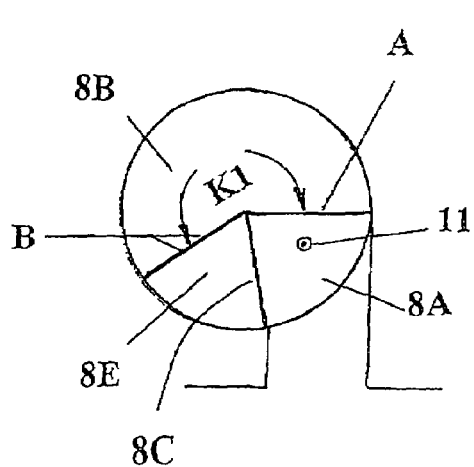
FIGS. 14 and 15 are similar to FIG. 11 but illustrate some possible design variations concerning the helical ramp.
Figure 15:
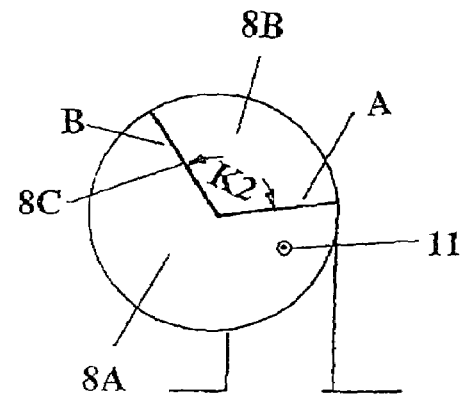

FIGS. 14 and 15 show two constructions of the helical ramp extending over different arc angles K1 and K2. In FIG. 14 the ramp terminates at line B to be followed by an elevated platform 8E which contains line B. Platform 8E continues to axial wall 8C which returns to platform 8A. In FIG. 15 the ramp terminates at B without a following elevated platform. Line B is also located on wall 8C which extends back to platform 8A.

The choice of arc K, the shape and extent of platforms 8A and 8E and wall 8C is available to the designer.

The promotion of helical swirl by such arrangements allows the use of the shortest possible transfer orifice 7 set at an angle of substantially 90° to the axis of the combustion chamber 6, and also allows the combustion chamber 6 to be set at substantially 90° to the axis of the cylinder. This can help reduce to a minimum fluid friction losses and heat loss from hot gases flowing through the orifice. The arrangement may also offer constructional advantages to the engine designer, particularly when dealing with four stroke engines. In particular, whilst in FIG. 1 the fuel injector 11 is shown angled downwardly towards the cylinder head with the combustion chamber inclined upwardly relative to the cylinder 2, the arrangement of FIG. 10 can allow the fuel injector to be positioned parallel with the cylinder head. This can be advantageous to the designer of a multi-valve multi-cylinder four stroke engine in avoiding interference between the injector and the cylinder head carrying the valve actuation mechanisms.

It is to be understood that there are a number of ways to promote an axial velocity component to swirling flow around the periphery of the combustion chamber if this is done by designing suitable internal surfaces which can separate the inducement of the axial velocity component in the air jet from the transfer orifice and instead induce this component by using internal surfaces in the combustion chamber. In so doing the inducement of the swirling velocity component is made independent from the inducement of the axial velocity component. The arrangements for generating the tangential component can be chosen independently of the requirement to produce the axial component.

Figure 13:
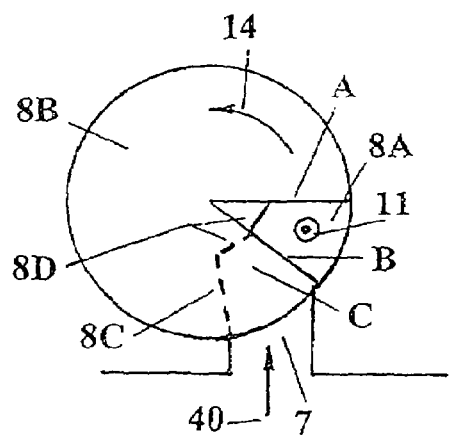
FIG. 13 is a view similar to FIGS. 11 and 12 showing an extended helical ramp designed to impart swirl motion in addition to axial motion.

Additionally, it may be desirable to use an internal surface of the combustion chamber to either create or amplify the peripheral movement of the air flow instead of only relying upon the tangential positioning of the transfer orifice to do the whole of this task, as shown in FIG. 5. One such arrangement is shown in FIG. 13 which is similar to FIG. 3 but where the helical ramp 8B is extended beyond 270° around the periphery of the combustion chamber to, in this embodiment, approximately 310° terminating at line B.

In this illustration the end wall 8C can remain situated slightly beyond 270° leaving a cavity C below the last remaining portion of the helical ramp. The ceiling of such a cavity, under the ramp, can be made to effectively extend the transfer orifice 7 into the combustion chamber under the roof of the last portion of the helical ramp. A deflecting wall 8D, situated wholly or partially under this roof, nearer the central axis of the combustion chamber, can be used to deflect the air jet in the tangential direction, towards the periphery of the combustion chamber and into the open space 8A.

The fuel injector delivery hole 11 is positioned in the space 8A allowing the fuel spray to reach the far end of the combustion chamber where the spark plug is situated.

From there the deflected peripheral flow continues onto the radial line A where the helical ramp 8B starts.

The deflecting surface 8D can be made curved or flat or a combination of both and can extend beyond the roof at the end of the ramp as shown, or it can terminate at the line B where the ramp also terminates.

Such an arrangement can be used with a transfer orifice 7 placed somewhat away from a tangential position as shown in FIG. 13. In this way the peripheral movement is imparted in combination both by internal surface 8D and also by the near tangential orientation of velocity vector 40.

Figure 16:
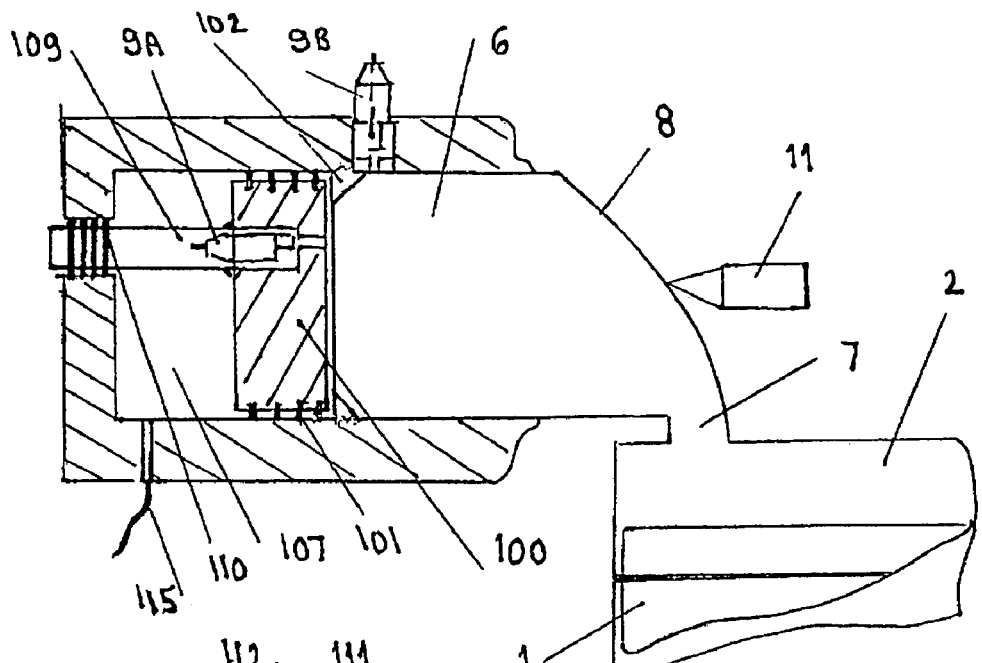
FIG. 16 illustrates a section of one possible combustion chamber design which allows a variable compression ratio using hydraulic actuation of the plunger.
Figure 17:
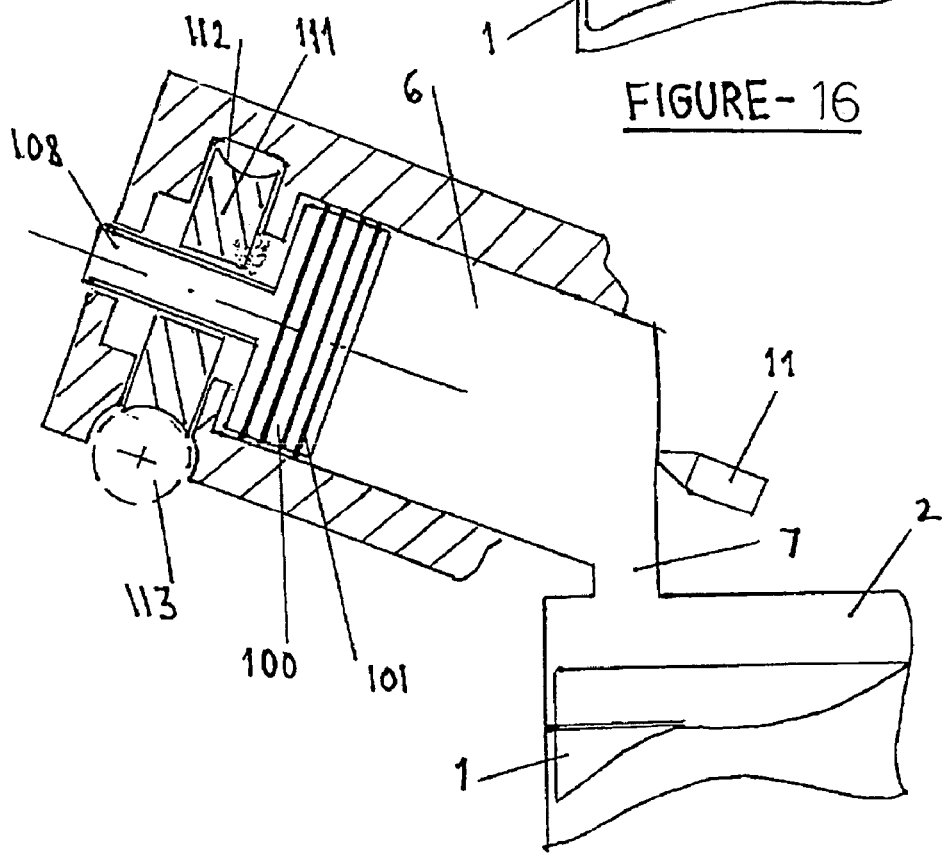
FIG. 17 illustrates a section of a second combustion chamber using electric-mechanical actuation of the plunger.
Figure 18:
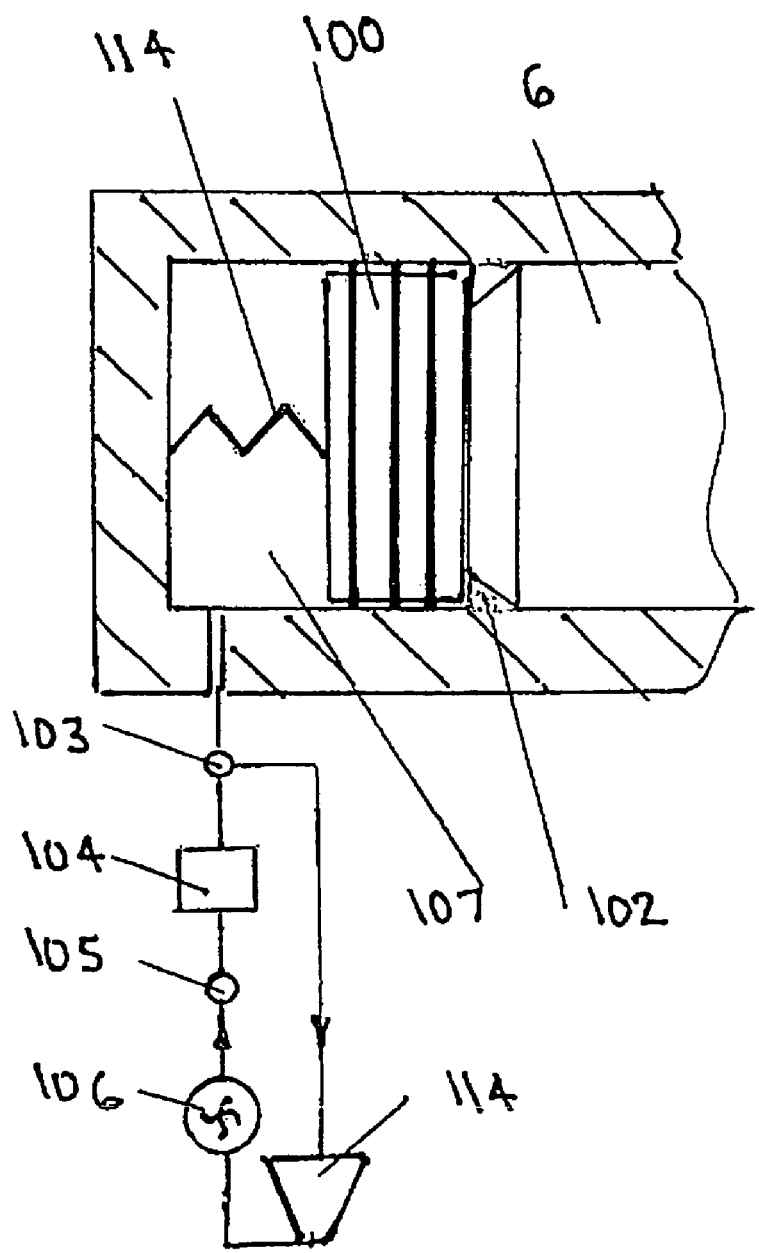
FIG. 18 shows further details relating to a possible method for hydraulic actuation of the plunger.

FIGS. 16-18 show the variable compression ratio aspect of the present invention. As before, the air moves in the combustion chamber 6 in a helical swirl flow. In the embodiment of FIG. 16 the axial component of the flow is induced by the shaping of the end wall 8 of the combustion chamber, and in the embodiment of FIG. 17 the axial component of the flow is induced by the orientation of the transfer orifice relative to the combustion chamber.

To provide variable compression ratio the cylindrically shaped combustion chamber 6 has a movable wall or boundary in the form of plunger 100 at its far end. The plunger is provided with peripheral multiple seals 101, for example piston ring type seals, capable of withstanding elevated temperatures. The external walls of the combustion chamber can be cooled, for example by a water jacket, to protect the seals. The plunger is shown at its innermost position, promoting the highest value of compression ratio and is constrained from moving further by ridge 102 which can also provide a further sealing face.

The space 107 behind the plunger is filled with hydraulic fluid, preferably liquid such as oil, piped into the space through pipe 115 leading to a hole. Compressed gas may be used if preferred and a suitable supply can be arranged. The fluid is pressurised by a pump to a pressure which must exceed the peak cylinder pressure at the end of the combustion period.

Two possible positions for the spark plug 9 are shown in FIG. 16. If position 9A is desired the plug needs to be surrounded by tube 109 attached to the plunger by a leak proof joint, for example by a weld, and the tube will need its own seal 110 as it moves with the plunger.

If position 9B is chosen it needs to be near the face of the plunger, at its innermost position as shown, to allow spark ignition under lean combustion conditions. Both spark plugs are shown in an ignition cavity which communicates with the combustion chamber through a small hole, so as to minimise the wetting of the spark plug by injected fuel under idling and low load conditions, but this is not essential if ignition can be assured by exposed spark plugs.

The plunger is kept at its high compression ratio position, as shown in FIG. 16, for starting and low load conditions and when the fuel supply is increased the hydraulic line controller allows some fluid to be discharged from space 107 to enable the peak cylinder pressure to displace the plunger to a lower compression ratio position. The discharge can be controlled by a variable pressure relief valve which restricts cylinder peak pressure to a desired value.

FIG. 17 shows a mechanical means for actuating and controlling the position of the plunger 100. The plunger is attached to stem 108 which is screw threaded and nut 111 is captured in the casing where it can rotate to actuate movement of the plunger. The rotation is shown to be effected by a worm 113 and wheel 112 arrangement and the worm may be rotated by an electric motor, for example a stepping motor. This method allows a precise positioning of the plunger over its movement range but it may require more hardware compared with the hydraulic system for a multi-cylinder engine.

FIG. 18 shows a hydraulic system in greater detail. A spring 114 may be used to augment the hydraulic pressure. It can be a tension spring to allow a low compression bias or a compression spring to allow the opposite condition which is needed for starting the engine.

A possible hydraulic control system is also illustrated. Dumping valve 103 can be a variable pressure relief valve or it can be operated electrically by the engine management system to maintain a desired pressure in cavity 107. Dumped liquid is collected in reservoir 114 and pumped into accumulator 104 by pump 106. Non-return valve 105 allows the pump to rest when the desired accumulator pressure is reached.

It should be appreciated that there are many ways of controlling the position of the plunger and many engineering applications use them, for example hydraulic machinery such as diggers and cranes. The novelty of this aspect of the invention does not rely only on the method of actuation, but offers a unique combustion system which enables stratified charge lean burn combustion to take place efficiently whilst allowing changes of the volume of the combustion chamber without interrupting engine operation. In spark ignition engines, lean burn combustion can take place at higher compression ratios than stoichiometric combustion, so that a combination of lean-burn and variable geometry combustion chamber offers a unique capability to a spark-ignition engine to operate at very high thermal efficiency at part load taking advantage of both lean burn and high compression ratio. In other words it allows a spark-ignition engine to gain similar efficiency advantages available to compression-ignition engines which can also burn lean at part load and do so at high compression ratio.

The variable compression ratio capability will allow an engine to operate efficiently whilst turbocharged by moderating the peak cylinder pressures. This can be achieved by decreasing the compression ratio of the engine when excessive peak pressures are encountered.

Although this invention has been described above with reference to particular means, materials, and embodiments, it is to be understood that the invention is not limited to these disclosed particulars, but extends instead to all equivalents within the scope of the following claims.

The invention claimed is:

1. An internal combustion engine comprising
a piston reciprocating in a cylinder;
air inlet means communicating with the cylinder;
exhaust means communicating with the cylinder;
an indirect combustion chamber communicating with the cylinder comprising a near end and a far end in relation to the piston;
transfer orifice communicating with the cylinder and the combustion chamber at its near end;
spark ignition means located in the combustion chamber;
a fuel injector communicating with the combustion chamber;
a controller to control the fuel injection process and spark ignition event;
wherein the transfer orifice is adapted to deliver a jet of air into the combustion chamber during the compression stroke of the piston, the jet of air moving around the periphery of the combustion chamber in helical swirl motion in which the jet of air has a tangential velocity component around the combustion chamber and an axial velocity component along the combustion chamber, the axial velocity component being directed away from the near end and towards the far end, and in that the fuel injector is adapted to deliver some fuel into the said jet of air within the chamber in a direction which also enables a spark ignitable mixture to form in the gas arriving at the spark ignition means.

2. An engine according to claim 1, wherein the fuel injection means is situated to deliver fuel into the jet of air at an angle to the axis of the jet of air.

3. An engine according to claim 1 wherein the fuel injection means is situated to direct fuel delivery towards the far end of the combustion chamber.

4. An engine according to claim 1 wherein the piston has a crown, and wherein the crown has a cavity.

5. An engine according to claim 1 wherein the fuel injection means is situated to deliver fuel directly towards the said jet of air along an axis substantially coincident with the axis of the said jet.

6. An engine according to claim 1 wherein the fuel injection means is situated to deliver fuel directly towards the said jet of air along an axis substantially parallel with the axis of the said jet.

7. An engine according to claim 1 wherein two spark ignition means are used to effect ignition at two different locations.

8. An engine according to claim 1 operating on the two stroke cycle.

9. An engine according to claim 1 operating on the four stroke cycle.

10. An engine according to claim 1 wherein the air intake into the cylinder is not restricted.

11. An engine according to claim 1 wherein the combustion chamber has a longitudinal axis and the transfer orifice is directed substantially perpendicularly to the longitudinal axis, and wherein the axial velocity component of the helical swirl flow is induced by shaping of the near end of the combustion chamber.

12. An engine according to claims 11 wherein the shaping of the near end of the combustion chamber is in the form of a helical ramp.

13. An engine according to claim 12 wherein the helical ramp extends radially to the periphery of the combustion chamber and over an angle which is less than 360° around the longitudinal axis of the combustion chamber.

14. An engine according to claim 11 wherein the shaping of the near end of the combustion chamber is in the form of a helical groove formed in the surface of the periphery of the combustion chamber.

15. An engine according to claim 11 wherein a cavity is formed at the near end of the combustion chamber which connects with and extends the transfer orifice, and wherein a surface inside the cavity is shaped to deflect the air movement in the tangential direction.

16. An engine according to claims 15 wherein the cavity is formed under a part of the helical ramp.

17. An engine according to claim 1 wherein the combustion chamber has a far end wall located at the far end and a side wall located between the far end wall and the near end, and wherein the far end wall of the combustion chamber can act as a plunger capable of movement relative to the side wall to vary the internal volume of the combustion chamber and the compression ratio of the engine during engine operation.

18. An engine according to claim 17 wherein the combustion chamber is cylindrically shaped at its far end.

19. An engine according to claim 17 wherein the plunger is movable along the axis of the combustion chamber over a predetermined distance.

20. An engine according to claim 17 wherein the plunger is provided with a peripheral seal to restrict or eliminate gas leakage though the peripheral gap between the plunger and the side wall of the combustion chamber.

21. An engine according to claim 17 wherein the plunger movement is actuated hydraulically.

22. An engine according to claim 17 wherein the plunger movement is actuated mechanically using a screw and nut arrangement.

23. An engine according to claim 17 which is turbocharged.

24. An engine according to claim 17 which is supercharged.

* * * * *